Sept. 29, 1936.　　　R. S. SMITH　　　2,055,710
PISTON METER
Filed June 12, 1931　　　4 Sheets-Sheet 2

INVENTOR
R. Stanley Smith
BY
Wheeler, Wheeler & Wheeler
ATTORNEYS

Sept. 29, 1936.  R. S. SMITH  2,055,710
PISTON METER
Filed June 12, 1931  4 Sheets-Sheet 4

INVENTOR
R. Stanley Smith
BY Wheeler, Wheeler & Wheeler
ATTORNEYS

Patented Sept. 29, 1936

2,055,710

UNITED STATES PATENT OFFICE 2,055,710

PISTON METER

R. Stanley Smith, Beverly Hills, Calif., assignor to Badger Meter Manufacturing Company, Milwaukee, Wis., a corporation of Wisconsin Application June 12, 1931, Serial No. 543,976

21 Claims. (Cl. 73—247)

This invention relates to improvements in meters.

Broadly stated, it is my object to provide a meter which will be accurate at all speeds of operation, will give uniform flow at any speed, may be used for light liquids such as gasoline, requires no adjustment to maintain its accuracy irrespective of wear, requires no packing rings on its displacement members, and has a minimum of friction.

More particularly stated, I propose to minimize friction and promote accuracy by using a pressure equalizing device instead of packing rings for the prevention of leakage from the operating cylinders to the output of the meter. I propose further to ensure accuracy by providing fixed stops limiting piston movement, whereby to regulate displacement independently of the throw of any crank or cam. Another means of securing accuracy is the combination with positively limited pistons of a valve mechanism with which, because of the lost motion at certain points in the movement of the respective pistons to their respective stops, it is possible to provide sufficient overlap in the opening and closing of successive ports in the movement of the valve to prevent leakage and to permit the closing of one port substantially in advance of the opening of the next.

It is my further purpose to provide for uniform flow at a given speed of operation of the device by means of an eccentric or cam operating on two pairs of cross connected pistons and so laid out that acceleration in the rate of movement of one piston will be exactly compensated by deceleration in the rate of movement of another.

It is my further object to provide a novel and improved valve mechanism giving maximum valve openings and preferably handling inlet and exhaust ports with a single operating part requiring no packing.

Other objects and advantages of the invention will be apparent from the following description.

In the drawings.

Like parts are identified by the same reference characters throughout the several views.

As will be understood from my statement of objects, the meter herein disclosed is a meter of the piston displacement type. While it may be used for metering any liquid, it is particularly adapted and intended for use in connection with gasoline dispensing apparatus of the conventional type in which a motor driven pump supplies liquid under constant pressure to the meter and the meter is driven by the gasoline passing to the dispensing hose when the valve therein is open.

The body of the device comprises a casing 10 providing integrally cylinders 11, 12, 13 and 14, transfer passages 15 overlying the respective cylinders, and a planiform valve seat 16 having ports 17 communicating with the respective passages 15 and a central port 18 communicating through conduit 19 with the discharge hose.

The cup-shaped portion 20 of the casing, through which port 18 communicates with discharge conduit 19, shuts off communication between the several transfer ducts 15 and also serves to support a bearing 21 for the meter shaft 22. A similar but shallower cup-shaped portion 23 of casting 10 supports an aligned bearing 24 for the meter shaft. The two bearings are spaced just sufficiently to accommodate the cam or eccentric 25 which is fast upon the shaft and is operated by pistons 26 and 27 comprising pairs in opposite cylinders.

The pistons of each pair are rigidly interconnected by integral upper and lower legs bifurcated to clear the shaft bearings 21 and 24 and having their end faces joined in abutment in a central plane, whereby the pistons comprising each pair are identical with each other. The upper and lower legs or connecting rod elements 30 and 31 of pistons 26 are spaced above and below the respective upper and lower connecting rod elements 32 and 33 of pistons 27. Dowels 34 are preferably used to insure accurate registration and screws 36 having their heads countersunk in the faces of the pistons and passing through the respective leg portions thereof hold opposing pistons together. Each piston is formed with spaced boss portions at 37 to receive and confine against axial displacement a cam follower roller 38 journaled upon a pin 39 passing through the upper and lower bosses.

The pistons are preferably die-cast and in order to provide adequate peripheral bearing surfaces they are preferably cast within the tubular bearing sleeves 40. The outer end of each such sleeve is turned inwardly upon itself and made to approach the inner wall of the sleeve, as shown at 41. The inner end of each sleeve is beveled toward its inner surface as shown at 42. As a result of this construction the metal of which the piston is die-cast becomes anchored with respect to both ends of the sleeve and when the die-cast metal shrinks, the sleeve becomes bound thereto with great rigidity, whereas otherwise the sleeve might be loose upon the piston. Centers are provided at 44 for the ends of the pistons whereby each pair of pistons may be trued up after assembly by grinding, machining, or otherwise finishing the cylindrical outer surface of the aligned sleeve 40 of the piston set.

Figure 4:
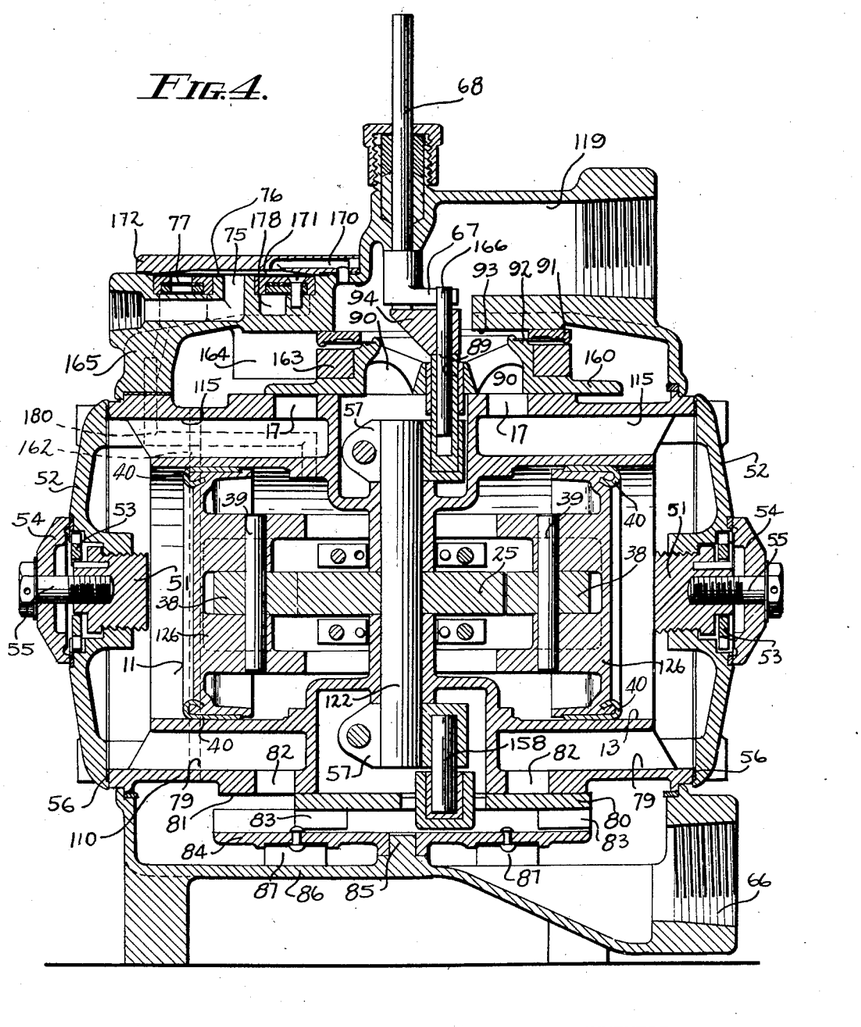
Figure 4 is a section similar to Figure 1, showing a modified form of the device.

Instead of defining the piston stroke by means of the throw of the crank or eccentric used to operate the meter, I ensure accuracy by providing shoulders at 50 constituting positive stops to limit the movement of each piston set in each direction. Where the stops are formed directly in the material of casing 10, as in the construction shown in Figures 1, 2 and 3, satisfactory adjustment of the piston stroke may be made with great accuracy by machining to the correct length the abutting end surfaces of the bifurcated connecting rods 30, 31, 32 and 33. The adjustment once made will never change since there is no frictional wear between the parts which limit the piston stroke, and the impact with which such parts engage is so minimized by operation of the cam as to be negligible. Where an adjustment is desired it may conveniently be provided through the medium of a plug 51, adjustable in the cylinder head 52 and maintained in any given position by an annular key 53 as shown in Figure 4. Such a plug may be adjusted by the removal of a special closure cap 54 seated on suitable packing and held by a cap screw 55 directly to the adjustment plug. The cylinder heads are designed for metallic seat against the cylinders outside of their respective gaskets in order to avoid disturbing an adjustment depending on the position of the head, and inward adjustment of the plugs 51 is limited to a predetermined amount by engagement of heads 51' with the adjacent portions of cylinder heads 52.

The operating connections from the pistons, whatever their nature, preferably provide a certain degree of lost motion to ease the piston to the stop before the extreme dead center position of the connections is reached and to perform the additional important function of providing a few degrees of lag in the valve operation. The parts are so proportioned that some lost motion remains even in the extreme position of plugs 51.

At its upper end meter shaft 22 carries a crank fitting 57 from which projects an offset crank pin 58. This pin seats in a central boss 59 in the valve member 60. This valve is square in plan, is provided with a hollow interior at 61 opening downwardly and bordered by a marginal flange 62. Engagement of crank pin 58 with the valve imparts to the valve an orbital movement but it is secured against rotation by means of a rectangular guide frame 63 which embraces the sides of the valve and within which the valve slides longitudinally. The lateral component of valve movement is absorbed by bodily reciprocation of the frame in ways provided at 64 in the valve housing 65. The liquid supply from the pump enters this housing through port 66 and its pressure holds valve 60 to its seat. The valve itself carries a peg at 66' which engages arm 67 of the extension meter shaft 68 to rotate the latter shaft in accordance with the rotation of meter shaft 22. The usual gear train is driven by shaft 68 to operate the meter indicating mechanism (not here shown).

The width of the horizontal flange 62, comprising the valve proper, slightly exceeds the width of ports 17 in the valve seat 16. The spacing of opposing flanges corresponds approximately to the spacing between opposing ports, but due to the orbital movement of the valve member, it cannot wholly close more than two ports at once.

Figure 1:
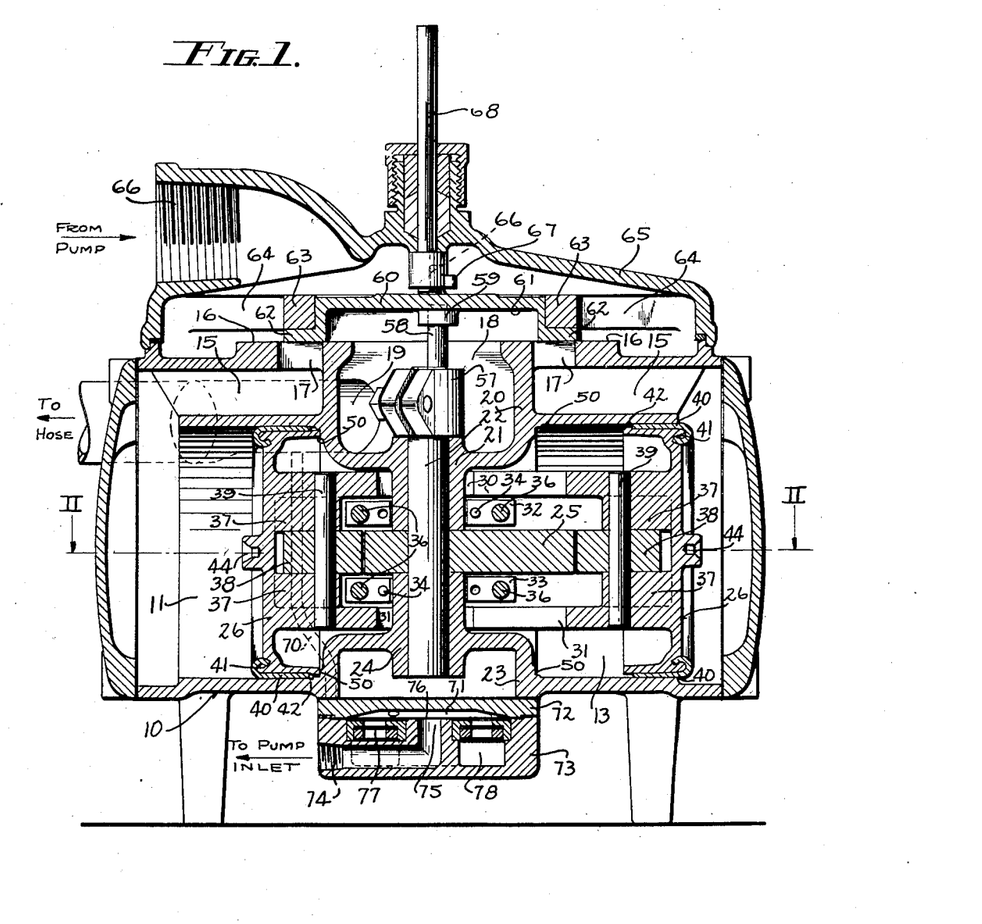
Figure 1 is a vertical axial section through a meter embodying this invention.
Figures 2, 3:
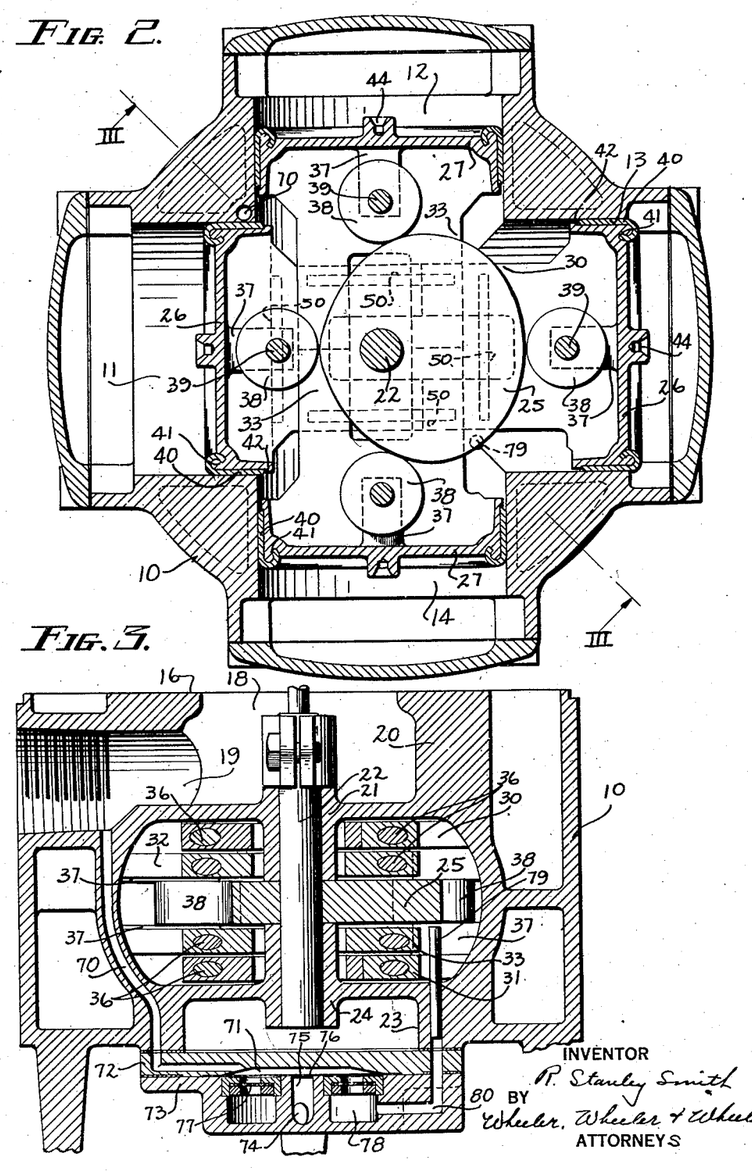
Figure 2 is a horizontal section taken in the plane indicated at 2—2 in Figure 1.
Figure 3 is a section through the meter casing without valve or valve housing, in the plane indicated at 3—3 in Figure 2.
Figures 5, 6, 7, 8, 9:
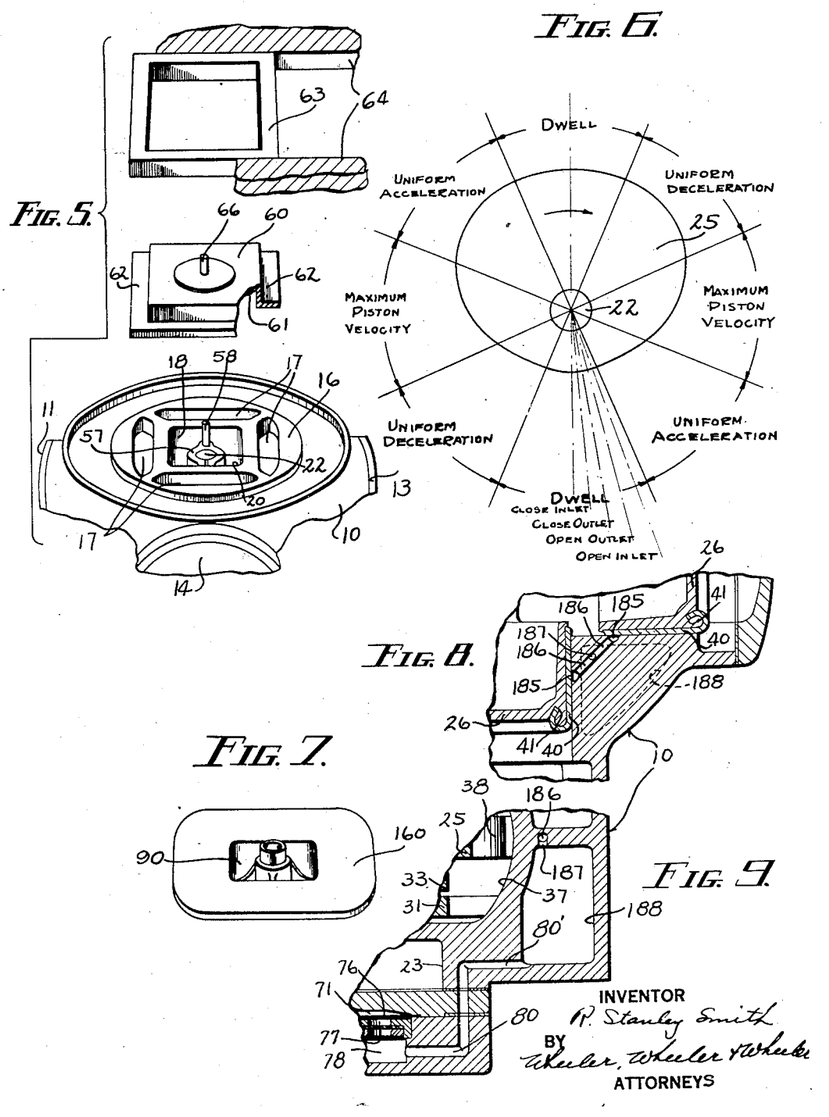
Figure 5 shows in perspective three of the component parts of the valve mechanism used in the device shown in Figures 1, 2 and 3.
Figure 6 is a diagrammatic layout of the operating cam used in both embodiments of the invention.
Figure 7 is a perspective view of the inverted outlet valve used in the embodiment shown in Figure 4.
Figure 8 is a fragmentary detail view similar to Figure 2, showing a modified means for intercepting leakage past the pistons.
Figure 9 is a fragmentary detail similar to Figure 3 showing how the intercepting chamber illustrated in Figure 8 communicates with the pressure equalizing chamber.

The operating cam 25 may conveniently have its periphery divided into 45 degree sectors, as shown in Figure 6. The sector which is symmetrical about that diameter of the cam which includes its greatest and smallest radii constitutes a dwell and is either concentric or deviates from concentricity just sufficiently to provide a tolerance of a few thousandths of an inch in order that each piston set may seat against a fixed stop, as shown in Figures 1 and 4. The larger radius sector is preferably concentric and the smaller is preferably relieved.

The sectors at each side of the central sector above described are laid out for uniform acceleration and deceleration respectively. The fact that the centerline of the sector for uniform acceleration is ninety degrees removed from the centerline of the sector for uniform deceleration ensures uniform delivery from the meter and a uniform rate of meter operation, since the discharge from one cylinder will increase in the identical proportion in which the discharge from the preceding cylinder decreases.

The intermediate sectors at the opposite sides of the cam represent maximum piston velocities. Here again uniformity results from the fact that the centerlines of these sectors are ninety degrees removed from the centerlines of the sectors of dwell so that one cylinder will be discharging and its opposite cylinder charging at maximum rate while the pistons in the other two cylinders are wholly at rest.

The operation of the valve mechanism is as follows:

According to adjustment or predetermined design of the mechanism, a given piston engages its stop anywhere from twenty two and one-half degrees before dead center to dead center. The slight eccentricity of the shorter radius dwell portion of the cam makes it possible to deposit the piston gently and without material impact against the stop at the inner end of its stroke.

At a point which, for example, may be taken as about five degrees past dead center, the given pistons of the set under consideration being fully at rest against the stop (regardless of the particular adjustment of the stop) the inlet port to the cylinder in which the piston has moved inwardly to the position shown at the left in Figure 1 is closed. This cylinder is now full of liquid.

The overlap of the valve flange 62 is such that it is not until a certain additional rotation of the valve in its orbital path has occurred that the outlet port of the cylinder in which the piston has made its displacement stroke to the position shown at the right in Figure 1 is closed. For example, the closing of this port may be assumed to occur at ten degrees past dead center.

At a point which may be assumed to be fifteen degrees past dead center the outlet port in the cylinder corresponding to that shown at the left in Figure 1 is opened.

At twenty degrees past dead center (for example) the inlet port of the cylinder corresponding to that shown at the right in Figure 1 is opened.

By thus providing an ample interval between the closing and opening of the several ports successively controlled by the movement of the valve, the escape of unmetered liquid is avoided, changes in output due to abrasion by dirt are eliminated and numerous other advantages are attained. The fact that the outlet port in the right hand cylinder remains open until after the closing of the inlet port in the left hand cylinder in Figure 1 and the fact that both of these operations take place after dead center, ensures the safe delivery of the pistons against their stops at the completion of a full stroke. Otherwise, any slight inaccuracy in manufacture might lock the movement of the pistons due to the premature closing of an outlet port. In any such case the incompressibility of the liquid would bring the pistons to rest at some position short of maximum displacement. Similarly the opening of the outlet port from the left hand cylinder in Figure 1 before the opening of the inlet port leading into the right hand cylinder also ensures a release of pressure in the left hand cylinder before pressure is admitted at the right. But for this arrangement there would be a possibility that pressure existing in the right hand cylinder without any corresponding movement of its piston would force a part of the liquid into a central crank chamber from the full cylinder at the left, thus destroying the accuracy of the apparatus. Because the outlet port opens before pressure is applied there is an immediate possibility of escape for the metered liquid as soon as the pressure admitted to the right hand cylinder initiates piston movement.

It is important to note that because two pairs of pistons are acting on a single meter shaft in the relation herein disclosed, the rotative torque upon the shaft is substantially constant. During the period of dwell of one set of pistons, the other is turning the shaft at a constant rate. Thus the lost motion connection is effective only between the shaft and those pistons which are at one or the other extreme of their movement and the rotation of the valve is regular although the movement of the pistons is intermittent. In attaining this result the use of a cam has advantages over any other type of connection and is preferred but it is immaterial to many of the broader objects of the invention whether the motion transmitting connections comprise a cam or an equivalent device or a series of devices in which lost motion may be provided to allow successive pistons to seat against positive stops at their limits of motion, while other pistons maintain a driving relation to the meter shaft.

Accuracy of a meter of this type is seriously affected by leakage past the piston or through the meter shaft bearing which reaches the discharge pipe leading to the hose. Ordinarily packing is used for the pistons and elsewhere, but such packing is disadvantageous in that it increases friction and cost of manufacture and maintenance. I am enabled to avoid any necessity for packing by means of an arrangement whereby I equalize pressure between the outlet chamber and the cam chamber and return from the cam chamber to the inlet side of the pump (or to the supply tank) any liquid leaking into the cam chamber under such pressure as to affect the accuracy of the device. In view of this equalization of pressures and elimination of leaking liquids under all circumstances where leakage might affect the accuracy of the meter, the amount of leakage which occurs otherwise is wholly immaterial and packing may be dispensed with.

It should be noted that in a double acting meter having liquid admitted alternately to opposite piston faces, it would be much more difficult to attain equalization than is the case in the disclosed arrangement where leakage from all sources can only go to a single, central crank or cam chamber in which pressures are easily regulated.

For equalization I cast into the meter casing 10 a duct 70 leading from the discharge conduit 19 to a pressure regulating chamber 71 in a fitting 72 attached to the underside of casing 10. A complementary fitting 73 is tapped at 74 for a return pipe to the tank or pump inlet and is provided at 75 with a valve port about which seats a diaphragm valve 76 clamped between the two fittings. Annular clamp rings carry a screen 77 to remove foreign matter from liquid admitted through annular chamber 78 to the vicinity of the valve and accumulations of foreign matter are further guarded against by providing a tubular extension 79 into the cam chamber of the duct 80 by which accumulations of liquid in the cam chamber are withdrawn.

It will be obvious that pressures in the exhaust conduit 19 are directly transmitted through duct 70 to the regulating chamber 71 above diaphragm 76. If pressures existing in the cam chamber within casing 10 are greater than pressures on the outlet conduit 19, the liquid passing through pipe 79 and duct 80 to the bleed chamber 78 will raise the diaphragm 76, thus opening port 75 for the escape of surplus liquid accumulations. Until the pressure within the cam chamber is equal to the outlet pressure in conduit 19 this valve will not open. Since the liquid escaping through the bleed port 75 and coupling 74 is discharged back to the supply tank or pump inlet, it will be obvious that it cannot mingle with the discharge to the hose and since pressures are equalized between the cam chamber and the hose there will be no such leakage into the hose from the cam chamber as might otherwise render the meter reading inaccurate.

Aside from the adjustable piston stops already described, the Figure 4 embodiment of the invention differs from that shown in Figures 1, 2, 3 and 5 only in the arrangement whereby two separate valves are provided for controlling admission and discharge of liquid to and from the respective cylinders. The new location of the inlet and inlet valve at the bottom of the device requires a different disposition of the equalizing bleed valve which, however, functions in the same manner above described.

It will be observed in Figure 4 that the transfer passages 116 overlying cylinders 11 and 13 in casing 110 serve for the exhaust of liquid only and passages underlying the cylinders are provided at 79 for the admission of liquid to the cylinders. The pistons 126 are connected in sets of two in the identical manner previously described and function in the same way. The meter shaft 122 has a crank fitting 67 at its lower end as well as at its upper end, the lower crank pin 150 being operatively connected to a disk valve 80 upon a seat 81 having ports 82 communicating with the respective transfer passages 79. Lugs 83 on the undersurface of the valve guide it for transverse reciprocation upon a carriage 84 which slides longitudinally on a key 85 fixed to the valve housing member 86. Springs at 87 overcome gravity and maintain the valve tight upon its seat 81. Liquid admitted through port 66 from the pump or other source of liquid under pressure passes under control of valve 80 through successive ports 82 to the several cylinders. This valve, like the one previously described in connection with Figures 1 and 5, has an orbital movement but is restrained by carriage 84 from rotation, thereby insuring maximum freedom of liquid movement through the elongated ports 82 which would otherwise have to be made segmental or crescent shaped.

The discharge from the several cylinders passes successively through the ports 17 under the control of valve 160, which is operated by a tubular crank pin 89, carried by the crank fitting 67 at the upper end of meter shaft 122. Valve 160 is guided by a rectangular carriage 163 operating in ways 164 in the same manner in which valve 60 and rectangular carriage 63 operate in ways 64 in the construction shown in Figures 1 and 5. In the Figure 4 construction, the liquid exhausted through port 17 passes upwardly through openings 90 in the valve to the discharge conduit 119. I provide at 91 a follower ring maintained by an annular spring 92 in contact with a bearing surface at 93, and closing chamber 164. This chamber is subjected through duct 162 to pressure of the liquid arriving through the inlet valve chamber. This pressure holds valve 160 to its seat.

A crank pin extension 166 projects from the tubular crank pin 89 into the path of arm 67 on the meter shaft extension 68 to drive it as before. End thrust of the extension meter shaft which was taken directly on the top of the valve 60 in the Figure 1 construction is, in Figure 4, taken on an abutment 94 carried by crank pin 89.

In the Figure 4 construction fitting 73 is unnecessary, its parts being formed directly in and upon the valve housing member 165. Duct 180 leads from the top of the cam chamber in casing 110 to the annular bleed chamber 178 of which the output must pass through annular screen 77 before it can reach the port 75 controlled by diaphragm 76. Fitting 172 contains a regulating chamber 171 similar to that shown at 71 in Figure 1 and communicating through a duct 170 with the discharge pipe. Regulation and equalization of the pressure between the outlet and the cam chamber is accomplished exactly as described above.

Figures 8 and 9 merely exemplify an arrangement whereby leakage is intercepted and pressures equalized by a chamber other than the "crank case" or the eccentric chamber of the apparatus. In the construction shown in Figures 8 and 9, each of the cylinders is provided about its inner periphery with an annular groove 185 which is so positioned as to be covered by the piston in all positions thereof, whereby to be adapted to intercept all leakage past the piston and to provide a pressure zone in which pressures may be so adjusted with reference to the meter discharge conduit as to minimize leakage. The annular chambers 185 communicate through ducts 186 and 187 with chambers 188 in the corners of the meter casing between the cylinders. Thence duct 80' leads to duct 80 and to the chamber 78 of the pressure equalizing device which functions exactly as in the construction shown in Figures 1, 2 and 3.

By way of summary, the operation of the device will be very briefly described.

Liquid admitted under pressure through inlet port 66 is controlled by a valve operated from meter shaft 22 to reach a cylinder in which the piston is at its outermost point. Under pressure of the liquid this piston and the opposing piston connected therewith will be caused to reciprocate and the cam follower roller 38 of the piston under pressure will act on cam 25 to rotate the meter shaft 22.

As above noted, the liquid contacting the face of said opposing piston will be permitted to escape during the advance of the piston which is under pressure and the cam is so designed that the acceleration of these pistons will exactly compensate for the deceleration of the set of laterally adjacent pistons until such laterally adjacent pistons come to rest. At this time, during the dwell of the adjacent pistons, the pistons first mentioned will move at a uniform rate. Finally the pistons first mentioned will uniformly decelerate toward the end of their stroke and a corresponding acceleration will be controlled by the cam in the laterally adjacent piston.

In all cases there is enough lost motion between the cam and the pistons of the respective sets to permit the use of positive stops for defining piston strokes. Due to the deceleration provided by the cam for the piston sets as they approach the stops there is almost no impact between the pistons and the stops. No ordinary wear between the operating parts can vary the piston strokes because of the fact that the stroke is determined by fixed stops, preferably located with reference to the cylinder block casting.

A single valve is preferably used not only to control admission of liquid to the cylinders but also discharge of liquid therefrom and in the preferred organization shown in Figures 1, 2, 3 and 5 this valve is held to its seat by pressure of the liquid and by gravity and requires no springs and no packing.

Leakage past the pistons is not permitted to affect the output through the hose supplied by the meter because of a special pressure equalizing device which bleeds accumulated leakage from the cam chamber under a pressure exactly corresponding to that in the discharge port.

I claim:

1. In a meter, the combination with a meter shaft and a plurality of paired cylinders diametrically opposite each other across the axis of the shaft, of a cam upon the shaft, aligned pistons in opposed cylinders rigidly connected with each other for simultaneous movement, means for supplying fluid to the several cylinders, valve means connected with the shaft and arranged to control the admission of fluid to successive cylinders, and cam followers connected with respective pistons and operatively coacting with the cam upon the shaft, said cam being shaped to provide lost motion such that each of said pistons may be impelled beyond the throw of said cam by fluid pressure on the piston connected therewith.

2. In a meter, the combination with a meter shaft and a plurality of paired cylinders diametrically opposite each other across the axis of the shaft, of a cam upon the shaft, aligned pistons in opposed cylinders, means for rigidly connecting said aligned pistons together for simultaneous movement, means for supplying fluid to the several cylinders and including valve means connected with the shaft and arranged to control the admission of fluid to successive cylinders, and cam followers connected with respective pistons and operatively coacting with the cam upon the shaft, together with opposing stops individually disposed in the path of connected pistons, whereby to limit their stroke in both directions independently of said cam and shaft, there being sufficient clearance between the cam followers of said pistons and the cam upon the shaft to ensure the effective operation of said stops.

3. In a meter, the combination with a casing providing integrally a plurality of diametrically opposite cylinders, of a shaft journaled in said casing and about which said cylinders are symmetrically disposed, a cam upon said shaft in the space between the cylinders, pistons in opposing cylinders having rigidly connecting portions offset from each other and from said shaft, and cam followers carried by the respective pistons.

4. In a meter, the combination with a casing providing integrally a plurality of diametrically opposite cylinders, of a shaft journaled in said casing and about which said cylinders are symmetrically disposed, a cam upon said shaft in the space between the cylinders, pistons in opposing cylinders having rigidly connected portions offset from each other and from said shaft, cam followers carried by the respective pistons loosely fitted for interaction with the cam upon the shaft, and stop means positively limiting the stroke of the several pistons in each direction, whereby to define their displacement in the respective cylinders.

5. In a meter, the combination with a casing member providing a plurality of pairs of aligned opposing cylinders, a meter shaft about which said cylinders are disposed, a cam upon said meter shaft, pistons operating in the cylinders and provided with upper and lower bifurcated legs rigidly connected together at opposite sides of the meter shaft, the said legs of one pair of pistons being offset axially of the meter shaft from the corresponding legs of another pair of pistons, cam follower means mounted upon the several pistons and operatively coacting with the cam upon the meter shaft, and valve means operatively connected to said meter shaft for operation therefrom, said casing providing inlet and outlet conduits and passages subject to the control of said valve means leading to the ends of said cylinders beyond the heads of the pistons therein.

6. In a meter of the piston displacement type, the combination with a meter shaft and a plurality of radially opposed cylinders, of pistons in said cylinders provided with cam followers, opposite pistons being rigidly connected together, and cam means on said shaft having a peripheral contour so determined as to maintain the total displacement of the pistons in the several cylinders at a substantially constant value.

7. In a meter of the piston displacement type, the combination with a meter shaft, of a casing providing radial cylinders opposed in pairs about said shaft, pistons reciprocable in the cylinders, means rigidly connecting the pistons in opposite cylinders, fluid passages communicating with the cylinders, valve ports communicating with the respective passages, valve means co-operating with said ports and operable in accordance with the rotation of the shaft for admitting fluid to successive cylinders, and a cam mounted on said shaft, cam followers operatively connected with successive pistons upon which fluid is acting under the control of said valve means, and interacting with said cam, said cam being developed to regulate the movement of each piston in accordance with the movement of the other pistons at a rate such that the combined movement of all pistons is productive of a substantially constant displacement value.

8. In a meter of the piston displacement type, the combination with a meter shaft, of a casing providing radial cylinders opposed in pairs about said shaft, pistons reciprocable in the cylinders, fluid passages communicating with the cylinders, valve ports communicating with the respective passages, valve means co-operating with said ports and operable in accordance with the rotation of the shaft for admitting fluid to successive cylinders, means unitarily connecting the pistons of opposing cylinders, and a cam mounted on said shaft, cam followers operatively connected with successive pistons upon which fluid is acting under the control of said valve means and interacting with said cam, said cam being developed to regulate the movement of each piston in accordance with the movement of the other pistons at a rate such that the combined movement of all pistons is productive of a substantially constant displacement value, said cam means including a concentric dwell portion, a compensatory portion productive of uniform rate of travel, and compensatory acceleration and deceleration portions.

9. In a meter, the combination with a fluid inlet passage, a fluid outlet passage, a meter shaft and a drive shaft, fluid operated means for rotating the meter shaft and a valve seat provided with ports leading to the several fluid operated means aforesaid, of a crank connected with the meter shaft to receive rotation therefrom, an imperforate valve connected with the crank for orbital movement upon the seat and closing said outlet passage from said inlet passage, a reciprocable carriage with respect to which said valve is slidably engaged for movement in the path transverse with respect to the path of reciprocation of the carriage, whereby said carriage is adapted to restrain the valve against rotation while accommodating its orbital movement, and a motion transmitting connection from said valve to said drive shaft.

10. In a meter, the combination with a meter shaft, a plurality of sets of cylinders in opposing pairs disposed about said shaft and pistons in said cylinders each interconnected with the piston of an opposing cylinder for simultaneous movement, of cam follower means upon said pistons, said meter shaft being provided with a cam acted on by said cam follower means, said cam having a sector concentric with said shaft providing a dwell for a piston engaged thereby, a valve seat provided with ports communicating with the several cylinders, a valve connected with said meter shaft for orbital movement upon said seat to open and close ports therein, and means restraining said valve against rotation in the course of its orbital movement, said valve being of non-circular form and said ports being extended in directions corresponding to the form of said valve.

11. A meter comprising two pairs of cylinders having their axes intersecting at right angles, a meter shaft disposed substantially at the point of intersection of the cylinder axes, a cam upon the shaft, pistons operable in the cylinders and provided with cam follower means coacting with the cam, a valve seat provided with ports communicating with the several cylinders and each substantially tangential with reference to an arc having the axis of the shaft as a center, a substantially square valve provided with a crank connection to said shaft and coacting with said seat to control the ports therein, and means restraining said valve against rotation in the course of its orbital movement on the seat, said means comprising a carriage guided for reciprocation in a direction across said seat in a fixed path and slidably reciprocable upon the valve in a direction at right angles to said path.

12. In a meter, the combination with a meter shaft and a central chamber providing bearings for said shaft, of a plurality of cylinders radially disposed with reference to said shaft, pistons reciprocable in the several cylinders and provided with cam followers, a cam upon said shaft adapted to be acted upon by the cam followers of successive pistons, means providing a valve seat and ports communicating with the several cylinders, a valve orbitally movable upon said seat and connected with said shaft to receive movement therefrom, a bleed chamber communicating with the central chamber, said bleed chamber being provided with a port and valve seat, a bleed valve controlling the discharge of fluid through the bleed port, a discharge conduit potentially communicating with the respective cylinders under control of said orbitally movable valve, a differential pressure responsive device, means including fluid paths exposing said device to pressures in said central chamber and in said discharge conduit, said device being connected with said bleed valve for the operation thereof.

13. In a meter, the combination with cylinders and pistons and a discharge conduit, of a valve controlling communication between said cylinders and said conduit, means operating said valve by movement of said pistons and means including a valve for equalizing pressures on opposite sides of the respective pistons when their cylinders are in communication with said conduit, and pressure controlled valve operating means including a duct communicating with said conduit.

14. In a meter, the combination with cylinders and pistons and a discharge conduit, of a valve controlling communication between said cylinders and said conduit, means whereby said valve is operated by said pistons and means for equalizing pressures on opposite sides of the respective pistons when their cylinders are in communication with said conduit, said means comprising a closed chamber between said cylinders closed against communication with said discharge conduit and adapted to receive leakage past said pistons and provided with a valve controlled bleed port, a valve controlling said port, and a pressure responsive device connected with the valve controlling said bleed port and fluid paths exposing said device to pressures in said chamber and said conduit.

15. In a meter, the combination with a cylinder, supply and discharge conduits, and a piston reciprocable in the cylinder; of a chamber closed against communication with said discharge conduit and positioned to receive leakage past said piston, and valve means for permitting escape of said leakage from said chamber at a rate such as to maintain a pressure therein in accordance with pressures in said discharge conduit.

16. In a meter, the combination with a valve and register actuating mechanism, a cylinder, supply and discharge conduits connectible with said cylinder, a piston reciprocable in the cylinder in response to fluid pressures in said conduits, and motion transmitting connections from said piston to said mechanism; of a chamber closed against communication with said discharge conduit and positioned to receive leakage flowing past said piston from its face toward said connections; a leakage discharge duct leading from said chamber; and a pressure operated valve controlling discharge through said leakage discharge duct and connected to be responsive to pressures in said discharge conduit and said chamber.

17. In a meter, the combination with a cylinder and a displacement piston operating therein and provided with actuating connections, of supply and discharge conduits, valve means controlling communication of said conduits with said cylinder, a leakage intercepting chamber closed against communication with said discharge conduit and having a portion positioned to intercept all leakage past said piston, and means including a valve operable to maintain in said chamber portion a predetermined pressure relation to the pressure of said discharge conduit.

18. In a meter, the combination with a cylinder and a displacement piston operated by fluid pressure therein and provided with meter mechanism actuating connections, of supply and discharge conduits connectible with said cylinder, valve means controlling communication of said conduits with said cylinder, a leakage intercepting chamber closed against communication with said discharge conduit and having a portion positioned to intercept all leakage past said piston, and means for maintaining in said chamber portion a predetermined pressure relation to the pressure of said discharge conduit, said means comprising a leakage discharge duct separate from said discharge conduit, a bleed valve controlling said duct, and diaphragm means for operating said valve subject to pressures in said discharge conduit.

19. In a meter the combination with a valve and register actuating mechanism, a cylinder and supply and discharge conduits for said cylinder, of a piston reciprocable in said cylinder, motion transmitting connections between said piston and said mechanism, a chamber closed against communication with said discharge conduit and enclosing said connections, and means including a valve for regulating pressure within said chamber in accordance with pressures in said discharge conduit.

20. In a meter the combination with a cylinder and supply and discharge conduits connectible with said cylinder, of a piston reciprocable in said cylinder and having a face acting on fluid in said cylinder, valve means controlling the flow of fluid through said conduits to said cylinder, motion transmitting connections between an opposite face of said piston and said valve means, a chamber enclosing said connections to receive leakage past said piston and provided with a bleed port, a valve controlling said port, means for operating said valve, and means adapted to subject said valve operating means to the pressures in said chamber and said discharge conduit, said valve operating means being operable in response to differences between such pressures.

21. In a meter of the piston displacement type, the combination with a central chamber in which leakage may accumulate and a plurality of cylinders about said chamber and provided with a common discharge conduit, of pistons reciprocable in said cylinders, a meter shaft operable in said central chamber, actuating connections between said pistons and shaft, valve means connected with said shaft, ports communicating with the respective cylinders and controlled by said valve whereby to control communication between the several cylinders and the outlet conduit, a bleed chamber, means communicating with said central chamber and with said bleed chamber, said bleed chamber being provided with a bleed port, a valve controlling said port, a pressure responsive diaphragm connected with said valve and exposed on one face to pressures in said bleed chamber, and a duct leading from the other face of said diaphragm to said discharge conduit and arranged to subject said diaphragm to pressures therein, whereby to control the discharge of accumulated leakage in said central chamber in accordance with relative pressures between said central chamber and said discharge conduit.

R. STANLEY SMITH.